United States Patent Office 3,536,389
Patented Oct. 27, 1970

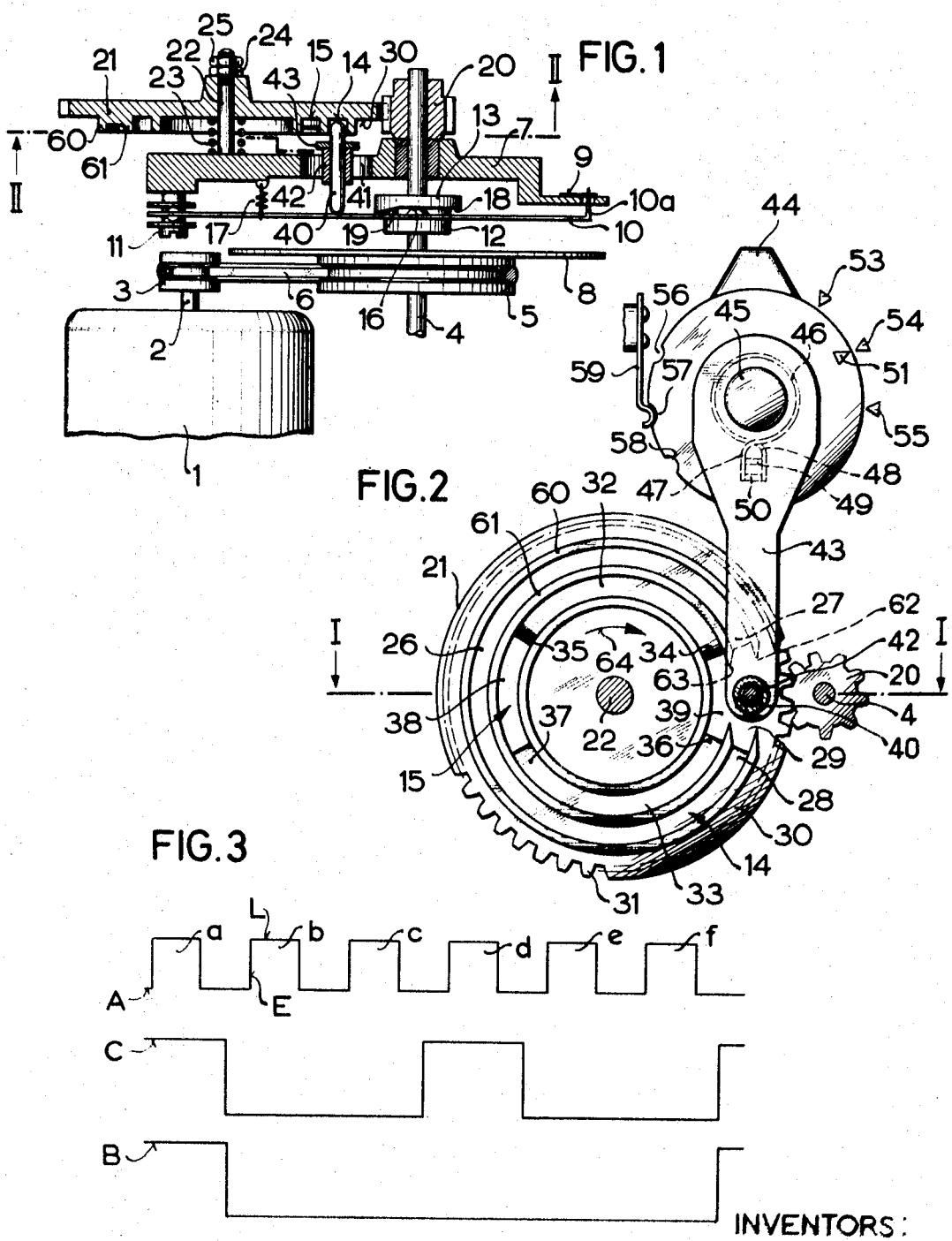

3,536,389
MOTION PICTURE PROJECTOR WITH FRAME
FREQUENCY CONTROL
Herbert Reinsch, Stuttgart, and Wolfgang Riedel, Winnenden, Germany, assignors to Robert Bosch Elektronik und Photokino G.m.b.H., Stuttgart-Unterturkheim, Germany
Filed Aug. 2, 1967, Ser. No. 657,907
Claims priority, application Germany, Aug. 11, 1966,
B 88,433
Int. Cl. G03b 21/48
U.S. Cl. 352—180                                22 Claims

ABSTRACT OF THE DISCLOSURE

The pulldown of a motion picture projector comprises several rotary in and-out-cams having in-and-out portions which effect in-and-out movements of the claw on the pulldown lever at different frequencies. A blocking device is provided to prevent a shift from an in-portion of a given cam to an out-portion of another cam and makes sure that the film is invariably advanced by the full length of a frame before a change in frame frequency occurs. The blocking device comprises rings which separate the cams from each other and are provided with windows permitting the follower for the pulldown lever to move from registry with an in-portion of a first cam only into registry with an in-portion of another cam.

BACKGROUND OF THE INVENTION

The present invention relates to motion picture projectors (hereinafter called movie projectors) in general, and more particularly to improvements in frame frequency controls for the pulldowns of movie projectors.

In operating a movie projector, the person in charge might find it necessary to change the frame frequency without changing the shutter speed, heretofore known frame frequency controls normally comprise a series of so-called in-and-out cams each of which can cause the pulldown lever to move its claw into engagement with the film at a different frequency. A follower transmits motion from a selected in-and-out cam to the pulldown lever. If the change in frame frequency occurs at the time when the claw of the pulldown lever travels in the direction of film advance, it can happen that the transport of the film is interrupted before the next frame is properly centered in the film gate. Also, the claw might tear the film by destroying one or more webs between the perforations. Attempts to prevent untimely disengagement of the claw from the film include the provision of a leaf spring which is operated by the in-and-out cams and serves to hold the claw away from the film when the pulldown lever performs a return stroke. The spring releases the claw when the pulldown lever has completed the return stroke so that the claw can penetrate into the adjoining perforation before the lever begins the next forward stroke and causes the claw to advance the film by the length of a frame. The bias of the spring is so weak that it cannot dislodge the claw from a perforation when the pulldown lever performs a forward stroke, not even in the event that the switchover from one to another in-and-out cam took place while the pulldown lever was carrying out a forward stroke. Movie projectors embodying frame frequency controls of the just outlined character are disclosed, for example, in German Pat. No. 1,095,659. A serious drawback of such frame frequency controls is that they are overly sensitive and unreliable. The bias of the spring which holds the claw away from the film while the pulldown lever performs a return stroke must be related, with utmost accuracy, to the tendency of the claw to remain in engagement with the film. The necessary adjustments upon completed assembly of the projector must be carried out by skilled workmen, and minor inaccuracies in the guidance of the film or in adjustment of the spring might cause a breakdown of the frame frequency control.

SUMMARY OF THE INVENTION

It is an object of our invention to provide a novel and improved frame frequency control for movie projectors which is of rugged design, which can invariably prevent untimely engagement of the claw with or disengagement from the film, and which can be designed to advance the film at two, three or more frequencies by resorting to a simple and reliable mechanism occupying little room and being sufficiently rugged to be readily manipulated by unskilled persons.

Another object of the invention is to provide a frame frequency control which can be set up to effect stepwise advance of the film at shorter or longer intervals while the projector is idle or while the motor which drives the shutter and the pulldown is in motion.

An additional object of the invention is to provide a novel in-and-out cam assembly for use in the pulldown of a movie projector.

A concomitant object of the invention is to provide a novel blocking device which determines the time when a change in frame frequency can take place.

Another object of the invention is to provide a frame frequency control for movie projectors wherein the film is advanced stepwise by a pulldown utilizing a pulldown lever whose claw is movable into and away from engagement with the film, and to construct and assemble the control in such a way that it does not in any way alter the basic operation of the pulldown.

An ancillary object of the invention is to provide a frame frequency control which can be operated by exertion of a minimal effort, which automatically remains in selected position of adjustment, and whose setting can be determined at a glance.

Briefly outlined, one feature of our invention resides in the provision of a movie projector wherein the film is advanced intermittently, always by the length of a frame, and wherein the shutter is driven at a constant speed irrespective of frame frequency. The projector comprises a shutter, drive means for driving the shutter at a predetermined speed, and a pulldown including a film engaging member which preferably resembles a one-armed lever and has a film-engaging portion in the form of a claw movable in and counter to the direction of film advance as well as between first and second positions of engagement with and disengagement from the film to advance the film by the length of a frame while moving in the aforementioned direction and while being held in the first position thereof. The pulldown further comprises a plurality of travelling in-and out cams having in-and-out portions for moving the claw between the first and second positions at a different frequency, follower means for transmitting motion from the cams to the pulldown lever, selector means for establishing a motion transmitting connection between a selected in-and-out cam and the pulldown lever through the follower means, and blocking means controlled by the drive means for the shutter and arranged to prevent a shift of the follower means from an in-portion of a given cam to an out-portion of another cam or vice versa. The claw is permitted to advance the film at a different frequency only after it has completed a stroke in or counter to the direction of film advance. This insures that the frequency change does not affect the accuracy at which the film is being advanced lengthwise.

The in-and-out cams preferably include two or more coaxial cams mounted on or integral with a rotary carrier which receives motion from the drive for the shutter to rotate the cams at a speed which is proportional to the shutter speed. The follower means includes a post which is movable radially of the carrier and the blocking means comprises rings or barriers each surrounding one of the coaxial cams and having at least one window or cutout therein to permit movement of the follower post into engagement with the face of a selected cam when such window is adjacent to the post. Each of the coaxial cams has a face of such configuration that the follower post causes the claw to move to second position only after the claw has completed the transport of film by the full length of a frame.

An additional in-and-out cam is preferably provided on the shaft of the shutter and cooperates with a second follower of the follower means to move the claw at a maximum frequency when the follower post is held in a neutral or ineffective position.

The selector means preferably comprises a lever which can shift the follower post and is resiliently coupled to a manually operable manipulator which can prepare the selector to shift the follower post to a new position irrespective of the momentary angular position of the coaxial cams.

The novel features which are considered as characteristic of the invention are set forth in particular in the appended claims. The improved movie projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a movie projector whose pulldown embodies the improved frame frequency control, the section being taken in the direction of arrows as seen from the line I—I of FIG. 2;

FIG. 2 is a section as seen in the direction of arrows from the line II—II of FIG. 1; and FIG. 3 is a diagram showing different frame frequencies.

DESCRIPTION OF THE PREFERRED EMBODIMENTS

Referring first to FIGS. 1 and 2, there is shown a portion of a movie projector which comprises a rotary shutter 8 and a drive for the shutter. This drive includes a prime mover here shown as an electric motor 1 whose output shaft 2 carries a first pulley 3. A second pulley 5 is mounted on the shaft 4 of the shutter 8 and is driven by an endless V-bolt 6 which is trained around the pulley 3. The rotational speed of the motor 1 and the ratio of the transmission including the pulleys 3, 5 and belt 6 are selected in such a way that the shaft 4 is driven at a predetermined speed, for example, at 18 revolutions per second. The shaft 4 of the shutter 8 is journalled in an internal partition or wall 7 of the projector housing. The shutter 8 has a cutout or opening which permits passage of a light beam from the projection lamp (not shown), through the film 9, and onto a projection screen (not shown) when the film is at a standstill. The shutter 8 interrupts the light beam when the film 9 is being advanced by the length of a frame, such stepwise or intermittent advances of the film being effected by a novel pulldown which includes a motion transmitting member 10 (hereinafter called pulldown lever). The lever 10 is a one-armed lever and one of its ends is turnable and tiltable on a pivot pin 11 which is carried by the partition 7. The other end of the lever 10 carries a tooth or claw 10a which can enter the adjoining perforation of the film 9. The arrangement is such that the claw 10a reciprocates back and forth in and counter to the direction of film advance (substantially at right angles to the plane of FIG. 1) and that the claw also moves in and out between a first position of engagement with the film 9 and a second position of disengagement from the film (up and down, as viewed in FIG. 1). Thus, the direction of movement of the claw 10a between such first and second positions is substantially at right angles to the direction of film advance.

A customary spring (not shown) biases an intermediate portion of the pulldown lever 10 against the peripheral face of a disk cam 12 which is rigid with the shaft 4 so that it rotates at the speed of the shutter 8. The purpose of the cam 12 is to effect (together with the aforementioned spring) reciprocatory movements of the claw 10a in and counter to the direction of film advance. The configuration of the peripheral face on the cam 12 is such that the claw 10a performs a movement in and a movement counter to the direction of film advance during each revolution of the shutter 8. As stated before, the film 9 is advanced by the length of a frame when the shutter 8 prevents the passage of light through the film.

The in-and-out cam assembly of the pulldown comprises three in-and-out face cams 13, 14 and 15. Each of these cams can impart to the pulldown lever 10 a movement to reciprocate the claw 10a at right angles to the direction of film advance. In the illustrated embodiment, the cam 13 is rigid or integral with the cam 12 and is driven by the shaft 4 of the shutter 8. The pulldown lever 10 has a first follower 16 which tracks the end face of the first in-and-out cam 13. The follower 16 is biased against the cam 13 by a helical spring 17 which operates between the pulldown lever 10 and the partition 7. The mounting of the spring 17 can be such that it simultaneously urges the pulldown lever 10 against the peripheral face of the cam 12. The end face of the cam 13 has a flat portion or recess 18 (in-portion) and a lobe or rise 19 (out-portion) which latter can cause the claw 10a to move from first to second position. In other words, the spring 17 maintains the claw 10a in the first position when the follower 16 tracks the flat portion 18 of the cam 13. The film 9 is advanced by the length of a frame when the follower 16 tracks the portion 18 and when the cam 12 cooperates with the first mentioned spring to move the claw 10a in the direction of film travel. When the stepwise advance of the film 9 is completed, the follower 16 reaches the lobe 19 and causes the claw 10a to leave the perforation. The cam 12 then causes or allows the claw 10a to perform a return stroke counter to the direction of film advance. Since the cam 13 has a single lobe 19 and since this cam rotates at the speed of the shaft 4, it causes the film 9 to advance at 18 frames per second as long as the follower 16 is permitted to track the face of the cam 13.

The shaft 4 carries a pinion 20 which meshes with the teeth 31 of a gear-shaped carrier 21, the latter serving as a driving element for and being preferably integral with the two coaxial in-and-out cams 14 and 15. The carrier 21 is turnable and axially movable on a shaft 22 which is affixed to the partition 7. A helical spring 23 biases the carrier 21 upwardly, as viewed in FIG. 1, so that the hub of the carrier bears against a stop nut 24 which meshes with the shaft 22. A lock nut 25 maintains the stop nut 24 in selected axial position.

The cams 14 and 15 have concentric annular faces which are turned toward the pulldown lever 10. The outer cam 14 has a single arcuate lobe or rise 26 (out-portion) which extends along an angle of about 300 degrees. The ends of this lobe 26 are bounded by inclined surfaces 27, 28 flanking the ends of an arcuate recess or depression 29 (in-portion). The axial distance from the bottom of the depression 29 to the plane of the shutter 8 exceeds the distance between such plane and the top face of the lobe 26. The teeth 31 of the carrier 21 form a circle around the outer in-and-out cam 14.

The inner cam 15 comprises two rises or lobes 32, 33 (out-portions) which are disposed diametrically opposite each other and each of which extends along an angle of about 110 degrees. The ends of these lobes are respectively bounded by inclined surfaces 34, 35 and 36, 37. The cam 15 is further provided with two recesses or depressions 38, 39 (in-portion) which are respectively disposed between the surfaces 34, 36 and 35, 37. The length of each of the recesses 38, 39 (as seen in the circumferential direction of the carrier 21) equals the length of the recess 29 of the cam 14. Furthermore, the recess 39 is inwardly adjacent to the recess 29 and its bottom surface is flush with that of the recess 29.

The means for transmitting motion from the cam 14 or 15 to the pulldown lever 10 comprises a pin- or post-shaped second follower 40 which is reciprocable in a hollow cylinder or sleeve 42 received with requisite clearance in a slot 41 of the partition 7. One end of the follower 40 can bear against the pulldown lever 10 between the first follower 16 and the spring 17, and the other end of the follower 40 can track the face of the cam 14 or 15. The sleeve 42 forms part of a selector 43 which resembles a one-armed lever (see particularly FIG. 2) and is turnable on a fixed shaft or pin 45 mounted on the partition 7 or on another stationary part of the projector housing. The sleeve 42 is remote from the shaft 45. The projector further comprises a manually turnable manipulator 44 having a lug which extends from the housing and may be grasped by hand to change the angular position of the selector in order to shift the follower 40 substantially radially of the carrier 21, i.e., toward or away from the shaft 22. The manipulator 44 is connected with the selector 43 by a simple yieldable coupling including a torsion spring 46 which is convoluted around the pin 45 and has two end portions or prongs 47, 48 straddling a pair of tongues 49, 50 which are respectively stamped from and bent out of the general planes of the members 43 and 44. The tongue 49 extends away from and tongue 50 extends toward the observer of FIG. 2, and these tongues are disposed between the members 43, 44. The prongs 47, 48 resemble the blades of shears. In order to facilitate the work of the user, the manipulator 44 carries an index or marker 51 which can be placed into registry with one of three graduations 53, 54, 55 provided on a fixed scale mounted on the housing of the projector adjacent to the periphery of the member 44. The position of the graduations 53-55 and index 51 can be reversed. A detent structure is provided to yieldably hold the manipulator 44 in selected angular position. This detent structure includes a resilient pawl 59 mounted on the housing of the projector and having a hooked nose bearing against the periphery of the manipulator 44. The latter has three notches 56, 57, 58 each dimensioned to receive the nose of the pawl 59. The bias of the pawl 59 suffices to prevent uncontrolled turning of the manipulator 44.

In accordance with a further feature of our invention, the pulldown comprises blocking means for preventing changeover from operation with the in-portion 18 of the cam 13 to operation with an out-portion of the cam 14 or 15 or vice versa. This blocking means includes two ring-shaped barriers 60, 61 the first of which surrounds the face of the cam 14 and the second of which surrounds the face of the cam 15. The arrangement is such that the blocking means prevents untimely switching between the in-and out portions of the cams 13-15 irrespective of the exact moment when the operator decides to turn the manipulator 44. In other words, the blocking means allows the projector to change the frame frequency only and alone from an in-portion of one cam to an in-portion of another cam or from an out-portion of one cam to an out-portion of another cam. The barriers 60, 61 (hereinafter called rings for short) are integral with the carrier 21 and are respectively provided with cutouts or windows 62, 63. The window 62 is outwardly adjacent to the recess 29 (in-portion) of the outer cam 14, and the window 63 is disposed between the recess 29 and the recess 39 (in-portion) of cam 15 and is deep enough to permit unobstructed travel of the second follower 40 from registry with the cam 14 into registry with the cam 15 or vice versa.

The operation is as follows:

When the index 51 of the manipulator 44 registers with the graduation 53, the projector is set to advance the film 9 at a maximum frequency, namely, at 18 frames per second. One end of the second follower 40 is then adjacent to an annular neutral surface 30 surrounding the outer ring 60 of the carrier 21. The follower 40 is then in neutral position, i.e., it cannot transmit motion to the pulldown lever 10 and claw 10a. Thus, the in-and-out movements of the claw 10a are controlled exclusively by the cam 13 which is tracked by the first follower 16. The in-and-out movements of the claw 10a (when the follower 16 is free to track the cam 13) are illustrated in FIG. 3 by the uppermost curve A. The horizontal top portions L of the curve A indicate the forward strokes of the claw 10a in the direction of film advance and the vertical portions E indicate the movements of claw 10a from the second to first position, i.e., into the adjoining perforation of the film 9. Each movement (E) of the claw 10a from the second to first position precedes a movemen (L) in the direction of film advance. The film 9 is advanced at 18 frames per second because the face of the cam 13 causes the claw 10a to perform a single movement in the direction of film advance and a single movement into the adjoining perforation during each revolution of the shaft 4. The curve A merely shows six of the eighteen forward strokes of the claw 10a, and such strokes are denoted by the characters $a$ to $f$.

The ratio between the rotational speeds of the shaft 4 (cam 13) and the carrier 21 is six-to-one. In other words, the carrier 21 completes one full revolution in response to six complete revolutions of the cam 13. If the projector is to be operated at the lowest frame frequency of three frames per second, the person in charge turns the manipulator 44 in a clockwise direction, as viewed in FIG. 2, and to the angular position shown in FIG. 2. The index 51 then registers with the graduation 54. If the angular position of the manipulator 44 is changed at the exact moment when the window 62 of the ring 60 is in line with the second follower 40 and shaft 22 (regardless of whether the motor 1 rotates or is at a standstill), the follower 40 is free to move radially of the carrier 21 and to advance its upper end (as viewed in FIG. 1) from registry with the neutral surface 30, through the window 62, and into registry with the bottom surface in the recess 29 of the cam 14. However, the situation is different if the window 62 is not adjacent to the follower 40 when the person in charge turns the manipulator 44 to the position shown in FIG. 2. The follower 40 then bears against the outer side of the ring 60 and is prevented from entering the confines of the cam 14. The coupling including the spring 46 and tongues 49, 50 permits the manipulator 44 to turn with reference to the selector 43 so that the nose of the pawl 59 can snap into the notch 57 when the index 51 registers with the graduation 54. The follower 40 continues to bear against the outer side of the ring 60 but the bias of the pawl 59 is stronger than that of the torsion spring 46 so that the manipulator 44 remains in the angular position of FIG. 2 and causes the spring 46 to store energy which is sufficient to move the follower 40 into registry with the cam 14 as soon as the angular position of the carrier 21 changes sufficiently to place the window 62 between the follower 40 and the shaft 22. When the carrier 21 assumes such angular position, the spring 46 immediately turns the selector 43 in a clockwise direction, as viewed in FIG. 2, and moves the follower 40 into requisite position with reference to the cam 14, i.e., into the recess 29 between the inclined surfaces 27, 28. When the follower 40 enters the recess 29, the angular position of the carrier 21 corresponds to such angular position of the cam 13 in which the follower 16 of the pulldown lever 10 is opposite the recess 18, i.e., when the claw 10a extends into the adjoining perforation of the film 9. The claw 10a is withdrawn from such perforation when the follower 40 completes its travel along the inclined surface 27 of the cam 14 and begins to track the lobe 26. This occurs at the time when the follower 16 is located opposite the lobe 19 of the cam 13. In other words, the interval during which the claw 10a remains in engagement with the film 9 is the same as if the in-and-out movement of the claw 10a would have been completed in response to engagement of the cam 16 with the lobe 19 of the cam 13. Otherwise stated, the transfer of the follower 40 from registry with the neutral surface 30 into registry with the cam 14 takes place at at time when the claw 10a engages with the film 9 and the cam 14 becomes effective to withdraw the claw 10a at the same time as would have been the case were the follower 40 still in registry with the surface 30.

When the follower 16 extends into the recess 18 of the cam 13, the distance between the pulldown lever 10 and the surface 30 of the carrier 21 (and the bottom surfaces of recesses 29, 39) should be slightly greater than the length of the follower 40. This insures that the spring 17 cannnot cause the follower 40 to bear against the surface 30, as long as the follower 16 engages the cam 13. Thus, the transfer of the follower 40 from registry with the surface 30 into registry with the groove of the cam 14 will take place practically without any friction because the spring 17 merely biases the follower 16 against the cam 13.

When the motor 1 is on, the carrier 21 rotates in a clockwise direction (see the arrow 64 in FIG. 2). When the follower 40 assumes the position of FIG. 2 and the motor 1 is on, the follower 40 travels along the inclined surface 27 of the cam 14 and is shifted axially with reference to the sleeve 42 against the opposition of the spring 17. The pulldown lever 10 is tilted with reference to the pin 11 and withdraws the claw 10a from the film 9 when the follower 40 engages the lobe 26. This takes place at the exact moment when the claw 10a has completed its forward stroke, i.e., when the film 9 has been advanced by the full length of a frame. The lobe 26 cooperates with the follower 40 to maintain the claw 10a away from the film 9. The cam 13 is ineffective, i.e., the claw 10a cannot leave its second position (in which it is disengaged from the film) as long as the follower 40 tracks the lobe 26 of the cam 14. The curve B of FIG. 3 illustrates the overriding function of the lobe 26. This lobe permits the claw 10a to enter the adjoining perforation when the inclined surface 28 completes its travel past the follower 40, and the claw 10a remains in engagement with the film 9 during travel of the recess 29 past the follower 40. When the inclined surface 27 again shifts the follower 40 with reference to the sleeve 42 so that the follower tracks the lobe 26, the claw 10a remains disengaged from the film while the claw 10a performs five forward and return strokes in and counter to the direction of film advance. In other words, the film is advanced during each sixth revolution of the shaft 4. Since the shaft 4 is assumed to rotate at 18 revolutions per second, the film is advanced at a frequency of three frames per second.

If the user decides to turn the manipulator 44 to such angular position that the index 51 registers with the graduation 55, the follower 40 is biased by spring 46 against the outer side of the ring 61 and moves into registry with the cam 15 when the window 63 moves between the sleeve 42 and the shaft 22. The follower 40 then extends into the recess 39 of the cam 15 and is shifted axially of the sleeve 42 by the inclined surface 34. When the follower 40 tracks the lobe 32, the claw 10a is held away from the film 9. The manner in which the follower 40 then controls the in-and-out movements of the claw 10a is illustrated by the curve C of FIG. 3. The lobes 32, 33 of the cam 15 prevent the claw 10a from engaging the film 9 while the claw respectively performs the forward strokes b, c and e, f. The claw 10a can advance the film when the follower 40 tracks the bottom surfaces of the recesses 38 and 39 (forward strokes a and d). The film 9 is advanced during each third revolution of the shaft 4, i.e., at a frequency of six frames per second.

Regardless of whether the clam 10a is controlled by the cam 13, 14 or 15, the rotational speed of the shaft 4 and shutter 8 remains unchanged. Thus, the change in frame frequency cannot produce flickering and/or affect the brightness of images.

As stated before, the frame frequency can be changed while the projector is idle or while the motor 1 is running. The rings 60, 61 insure that the frequency change determined by setting of the manipulator 44 will take place only when the follower 40 has reached the windows 62, 63 of the rings. In the absence of rings 60, 61, and assuming that the user decided to change the frame frequency from three to eighteen frames per second, the follower 40 could leave the lobe 26 of the cam 14 at a time when the follower 16 is located opposite the recess 18 of the cam 13. This would cause the follower 16 to track the surface in the recess 18 so that the claw 10a touches a web between two perforations. The claw would then damage the film.

It is clear that the aforementioned frame frequencies and shutter speeds were given for the sole purpose of facilitating the understanding of our invention. It is further clear that the in-and-out cam assembly may be arranged to furnish only two, four or more different frame frequencies without in any way departing from the spirit and scope of our invention. Also, the selector 43 could form an elastically deformable integral part of the manipulator 44, and the carrier 21 could receive motion from the motor 1 through a drive other than that which rotates the shutter.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. In a motion picture projector wherein the film is advanced intermittently, a combination comprising shutter means; drive means for said shutter means; and a pulldown including a film-engaging member movable in and counter to the direction of film advance and between first and second positions of engagement with and disengagement from the film to advance the film by the length of a frame while moving in said direction in the first position thereof, a plurality of travelling in-and-out cams having in- and out-portions arranged to move said member between the first and second positions at a different frequency, follower means for transmitting motion from said cams to said member, selector means actuatable to establish a motion transmitting connection between a selected cam and said member through said follower means, and travelling blocking means controlled by said drive means and having blocking portions for preventing a shift of said follower means from an in-portion of a given cam to an out-portion of another cam or vice versa, said blocking means further having unblocking portions permitting a shift of said follower means from a portion of a given cam to an equivalent portion of another cam or vice versa in response to actuation of said selector means.

2. A combination as defined in claim 1, wherein said pulldown further comprises means for driving said cams in synchronism with said shutter means, and further cam means receiving motion from said drive means and arranged to move said member in and counter to the direction of film advance during each revolution of said shutter means.

3. A combination as defined in claim 2, wherein said drive means is arranged to rotate said shutter means and said further cam means at a constant speed.

4. A combination as defined in claim 3, wherein each of said in-and-out cams is a rotary cam having an annular cam face adapted to be tracked by said follower means.

5. A combination as defined in claim 1, further comprising manipulator means for actuating said selector means and yieldable coupling means connecting said manipulator means with said selector means.

6. A combination as defined in clam 5, wherein said manipulator means and said selector means are turnable about a common axis.

7. A combination as defined in claim 5, wherein said selector means comprises a lever turnable about a fixed axis and said follower means includes a post reciprocably carried by said lever at a point remote from said fixed axis.

8. A combination as defined in claim 7, wherein said manipulator means is turnable relative to said lever about said fixed axis and said coupling means comprises a resilient element yieldably connecting said lever with said manipulator means for movement with and relative to each other.

9. A combination as defined in claim 1, further comprising detent means for yieldably holding said selector means in a plurality of manually determined positions.

10. A combination as defined in claim 9, further comprising manually operated manipulator means for said selector means, said detent means cooperating with said manipulator means.

11. A combination as defined in claim 1, further comprising rotary carrier means supporting at least some of said in-and-out cams and said blocking means, said carrier means receiving motion from said drive means.

12. A combination as defined in claim 11, wherein said carrier means is integral with said blocking means and with said last mentioned cams.

13. In a motion picture projector wherein the film is advanced intermittently, a combination comprising shutter means; drive means for said shutter means; and a pull-down including a film-engaging member movable in and counter to the direction of film advance and between first and second positions of engagement with and disengagement from the film to advance the film by the length of a frame while moving in said direction in the first position thereof, a plurality of travelling coaxial in-and-out cams having in and out portions arranged to move said member between the first and second positions at a different frequency, follower means for transmitting motion from said cams to said member, selector means for establishing a motion transmittting connection between a selected cam and said member through said follower means, and blocking means controlled by said drive means for preventing a shift of said follower means from an in portion of a given cam to an out portion of another cam or vice versa, said blocking means comprising a plurality of concentric rings each rotating with and each surrounding one of said coaxial cams and each having a window therein to permit displacement of said follower means by said selector means between said coaxial cams.

14. A combination as defined in claim 13, wherein said windows are positioned to permit passage of said follower means in the first position of said member.

15. A combination as defined in claim 14, wherein said follower means comprises a follower movable by said selector means substantially radially of said coaxial cams.

16. A combination as defined in claim 15, wherein said in-and-out cams include an additional cam arranged to rotate in synchronism with said shutter means and said follower means further comprises a second follower arranged to render said first mentioned follower ineffective in a predetermined position of said selector means.

17. A combination as defined in claim 16, wherein said coaxial cams have recesses adjacent to the windows of the adjoining rings, said recesses being positioned in such a way that said member can remain in first position while said follower moves along one of said recesses so that said member can complete the transport of film by the full length of a frame.

18. A combination as defined in claim 16, wherein said additional cam is arranged to advance the film at a maximum frame frequency in said predetermined position of said selector means.

19. A combination as defined in claim 18, wherein said shutter means comprises a shaft receiving motion from said drive means and said additional in-and-out cam is fixed to said shaft.

20. A combination as defined in claim 19, wherein said coaxial in-and-out cams are rotatable about a fixed axis which is parallel to the axis of said shaft and the means for rotating said coaxial cams receives motion from said drive means.

21. A combination as defined in claim 20, further comprising rotary carrier means rigid with said coaxial cams and said rings.

22. A combination as defined in claim 20, wherein the length of said first follower is less than the distance between said member and said coaxial cams when said member receives motion from said additional cam and is held in said first position thereof.

References Cited

UNITED STATES PATENTS

| 3,181,174 | 4/1965 | Griffiden et al. | 352—180 |
| 3,261,654 | 7/1966 | Faber et al. | 352—194 |
| 3,402,007 | 9/1968 | Gerlach | 352—180 |

FOREIGN PATENTS

| 1,125,536 | 10/1956 | France. |
| 277,344 | 12/1951 | Switzerland. |

JOHN M. HORAN, Primary Examiner

M. H. HAYES, Assistant Examiner

U.S. Cl. X.R.

352—191, 194